United States Patent [19]

Reynolds

[11] Patent Number: 4,619,161

[45] Date of Patent: Oct. 28, 1986

[54] SUPPORT FOR WHEEL LUG WRENCH

[76] Inventor: Keith H. Reynolds, 26 Samuel Rd., Chelmsford, Mass. 01824

[21] Appl. No.: 825,770

[22] Filed: Feb. 3, 1986

Related U.S. Application Data

[63] Continuation of Ser. No. 688,323, Jan. 2, 1985, abandoned.

[51] Int. Cl.$^4$ .............................................. B25B 23/00
[52] U.S. Cl. ...................................................... 81/462
[58] Field of Search ................. 81/52, 54, 180.1, 462; 248/544; 211/70.6

[56] References Cited

U.S. PATENT DOCUMENTS

| | | | |
|---|---|---|---|
| D. 180,106 | 4/1957 | Seifert | 211/70.6 X |
| 2,059,445 | 11/1936 | Eastman | 211/70.6 |
| 2,267,012 | 12/1941 | Bowne | 81/55 |
| 2,761,340 | 9/1956 | Harrington | 81/124.4 |
| 2,911,867 | 11/1959 | Ross | 81/462 X |
| 2,960,895 | 11/1960 | Richards | 81/53 |
| 3,097,550 | 7/1963 | Johnston | 81/53 |
| 3,577,818 | 5/1971 | Cramer | 81/462 |
| 3,730,027 | 5/1973 | Rohn | 81/180 R |
| 3,832,917 | 9/1974 | Feith | 81/53 R |
| 4,300,412 | 11/1981 | Houser et al. | 81/53 R |

FOREIGN PATENT DOCUMENTS 2659310 12/1976 Fed. Rep. of Germany ..... 211/70.6

Primary Examiner—Frederick R. Schmidt
Assistant Examiner—Debra S. Meislin
Attorney, Agent, or Firm—Hamilton, Brook, Smith & Reynolds

[57] ABSTRACT

A support (10) for a wheel lug wrench having a base (12) and slots (16) formed in at least one side at spaced intervals from the base to provide a series of wrench supports and to align wrench with the particular lug nut being removed.

19 Claims, 7 Drawing Figures

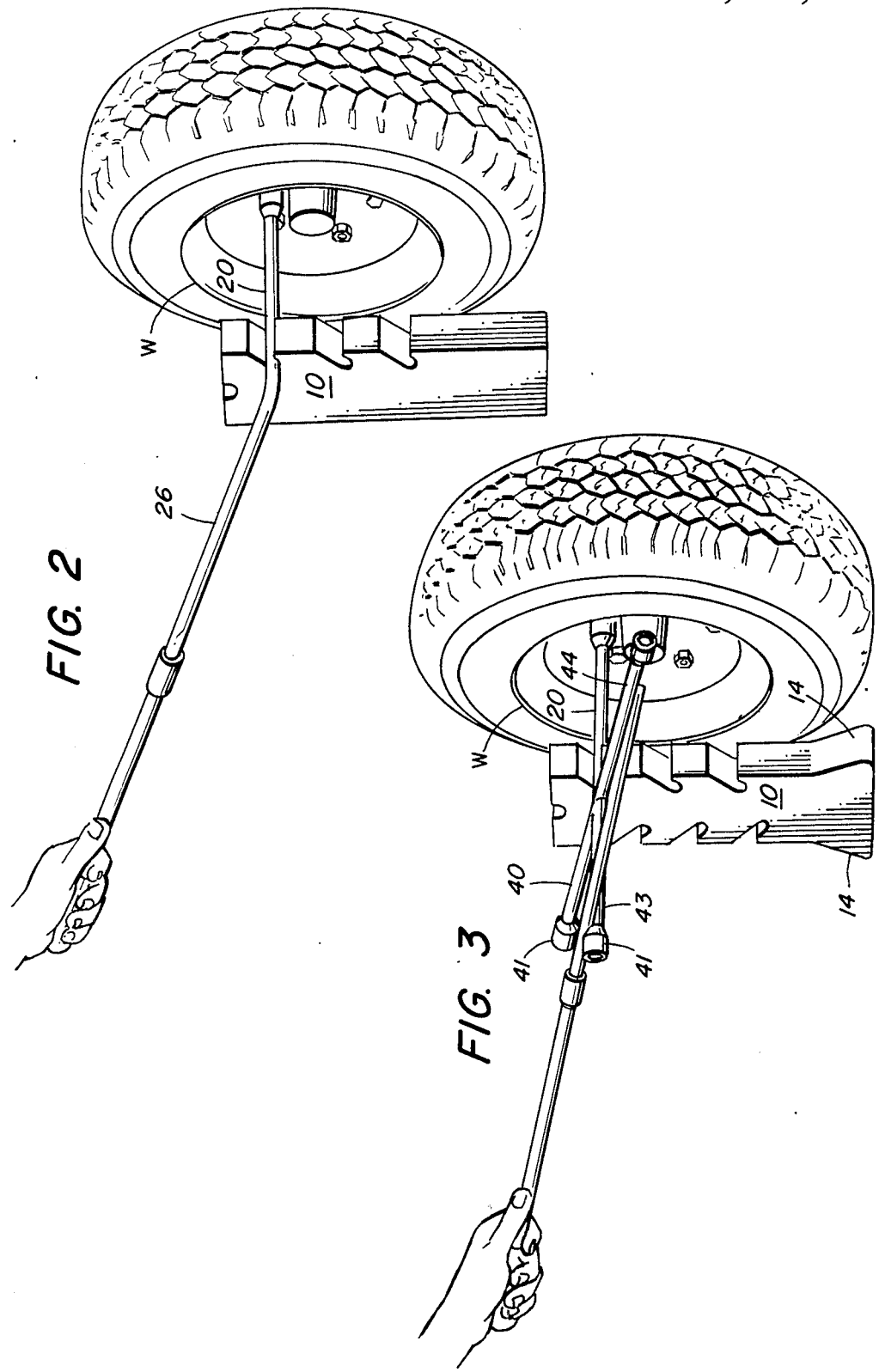

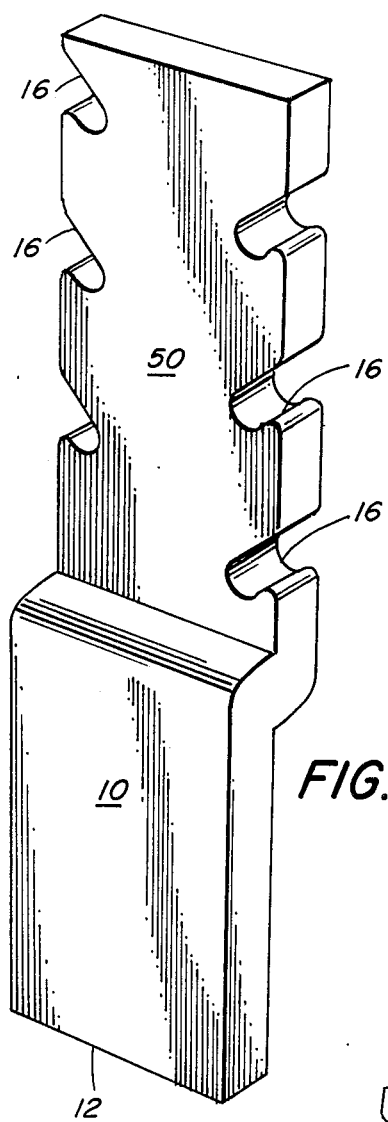
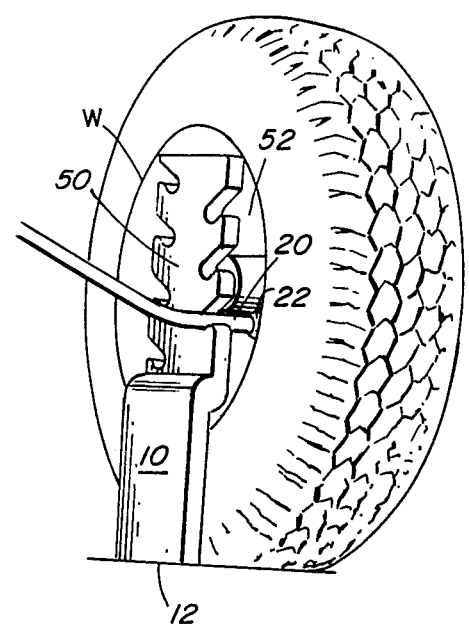
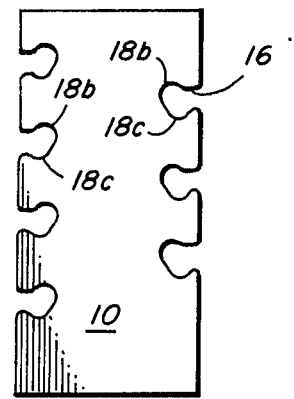
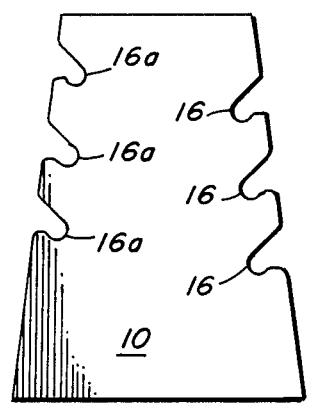
FIG. 6
FIG. 7
FIG. 5
FIG. 4

SUPPORT FOR WHEEL LUG WRENCH

RELATED APPLICATION

This application is a continuation of my copending application Ser. No. 688,323 filed Jan. 2, 1985 now abandoned.

DESCRIPTION

1. Field of the Invention

This invention relates to a support device which assists in the loosening and tightening of lug nuts which secure automobile wheels to axle hubs.

2. Background of the Invention

Conventional pneumatic impact wrenches, commonly used by automobile service stations and tire stores are so effective in tightening lug nuts, alternatively known as lugs or wheel nuts, that they make it difficult or impossible for them to be removed by a person of average, or below average, strength. This is particularly true when such person has no access to an impact wrench, whether on the road or at their residence. Rust and corrosion add to this problem.

The prior art recognizes this problem by providing support devices for lug wrenches or combined lug wrenches and supports which employ a variety of movable parts which enable the support devices to be adjusted for the different lug nuts of a typical automobile. They are intricate and can not be manufactured economically, and consequently are not readily found on the market.

One such device is described in U.S. Pat. No. 2,267,012 to Bowne and shows a dual wrench for removing dual wheels of the Budd type. The device includes a triangular support with one position for a rod, having a ratchet wrench fixed thereon, and having a socket for engaging a nut. The device does not allow for latitudinal removal of automobile wheel lugs without lowering or raising the vehicle.

U.S. Pat. No. 3,730,027 to Rohn discloses an adjustable truck wrench support. This device consists of a pair of telescoping tubular members having a cradle for the wrench at one end and a foldable base at the other free end. The height adjustment is by means of a pin engaging in one of a plurality of toothed slots within one of the telescoping members. The device is a heavy duty unit suitable for service trucks and garages but not suitable in size, weight and cost for transporting in a standard or compact automobile.

U.S. Pat. No. 2,960,895 to Richards discloses a wrench support consisting of a footed bar containing a plurality of notches to support an arm which is connected to a cradle which in turn supports a specialized lug wrench. The notched bar is supported by two braces with wheels at their bases. The complexity of the device makes it only practical for use by service establishments.

U.S. Pat. No. 3,832,917 to Feith discloses a device with a footed pipe which has a short slidable pipe thereon and held in an aligned position by tightening a hexagon headed screw. A double ended socket is slid over a pin affixed to the sliding pipe. A spanner wrench is utilized for loosening or tightening the lug. The utilization of such a device is time consuming and, due to the many parts required in manufacturing, the device is not a feasible consumer product.

It is an object of the present invention to provide a support device with no moving parts which can be used with existing conventional ell or cruciform lug wrenches to provide simple and efficient removal of automotive wheel lug nuts.

DISCLOSURE OF THE INVENTION

With the object of removing tight lug nuts while utilizing a conventional ell or cruciform lug wrench, the present invention embodies a wrench support in the form of a block, the base of which is solid for positioning on a firm support. The block has a plurality of wrench supporting slots formed in at least one side extending inwardly at an angle toward the base. The slots are located at spaced intervals from the base to provide a series of wrench supports for approximate alignment with the lug nuts that are to be removed. The closed end of each slot has an arcuate portion which is engagable with a lug wrench which thereby supports it. The wrench may be selectively positioned in a different slot to align it heightwise with the nut being removed or tightened.

In another embodiment of this invention, slots are located on both sides of the block in staggered relationship to those on the opposite side, whereby the distance between each slot and the base is different.

The wrench support may have an additional slot in the top of the support and thus spaced farther from the base than any of the other slots. This additional slot maximizes the necessary number of slots required to remove all lugs from most automobile wheels, while minimizing the height of the support.

An another embodiment, the wrench support which generally is rectangular, may be trapezoidal. The base of the block may also be flared outwardly to afford lateral stability.

The portion of the block in which the slots are formed may be offset from the base to position the slots closer to a lug nut than the base to accommodate a wrench having a short lever arm adjacent to its socket.

In another alternative construction, the closed end of each slot may have two arcuate portions, selectively engagable with a lug wrench to support it while removing or attaching a lug nut, one portion extending toward the base and the other one away from the base. By this construction, the block may be employed in inverted position to increase the number of available spaces from the base at which the wrench may be supported.

In order to increase the leverage of the lug wrench an extender is provided which is engagable with the lug wrench when the wrench is supported in a slot in the block and engaged with a lug nut.

DESCRIPTION OF THE DRAWINGS

FIG. 2 and 3 are perspective views on reduced scales of the support used with conventional ell and cruciform lug wrenches respectively.

FIGS. 4 and 5 are elevational views on reduced scales of additional embodiments of this invention.

FIG. 6 is a perspective view of another embodiment of this invention.

FIG. 7 is a perspective view on reduced scale showing the support of FIG. 6 being used with a conventional ell wrench.

BEST MODE OF CARRYING OUT THE INVENTION

Figure 1:
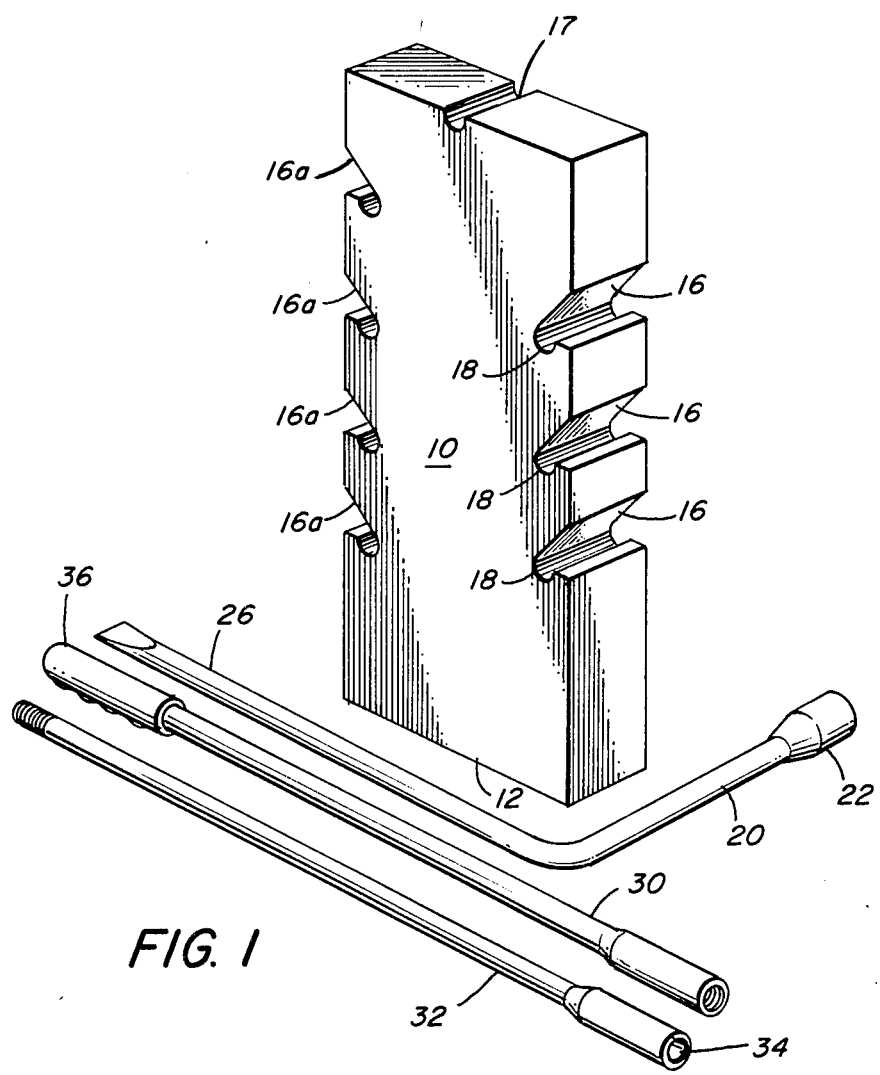
FIG. 1 is perspective view of a support for a wheel lug wrench embodying this invention.

Referring to FIG. 1 there will be seen a support for a wheel lug wrench comprising a block 10, which is substantially rectangular in configuration, having a base 12 for positioning on a firm support. If desired the block may be flared outwardly as at 14 (see FIG. 3) to afford greater lateral stability. A plurality of wrench supporting slots 16 are formed in at least one side of the block, as, for example the right hand side as seen in FIG. 1. They extend inwardly and are inclined toward the base. The slots 16 are located at spaced intervals from the base to provide a series of wrench supports. At the closed end of each slot is an arcuate portion 18 shaped to received the arm 20 of a conventional ell shaped wrench or the corresponding portion of a cruciform wrench, which is the portion of the wrench adjacent its socket 22. With the block 10 in vertical position as seen in Figures 2 and 3, the portion 20 of the lug wrench is placed in whichever slot 16 is closest heightwise to the lug of a wheel W which is to be removed. With the socket of the wrench on the lug nut and the wrench supported by the block 10, a person depresses the lever arm 26 of the lug wrench to rotate the wrench in a counterclockwise direction as viewed in Figure 2 to remove the tight lug nut without having to support the wrench manually.

To increase the leverage of the wrench, one or more extenders 30 and 32 (FIG. 1) may be employed by placing the open end 34 of an extender over the lever arm portion 26 of the lug wrench. For convenience, a hand grip 36 may be positioned on the opposite end of either of the extenders.

When using a cruciform wrench 40 as seen in FIG. 3, the extender 30 would not be placed over the lever arm because each arm has a socket 41 of different size located at its ends. Rather the second extender 32 would be joined to the extender 30 and together used as a lever, fulcrumed on the arm 43 of the cruciform wrench while prying up on the arm 44 which causes the arm 45 whose socket is on the lug nut being removed, to rotate.

Referring again to FIG. 1, if desired, slots 16a may be formed on the opposite side of the block 10 in staggered heightwise relationship to slots 16. This provides a greater number of slots from which to select the one that is most closely aligned heightwise with the lug nut being removed.

To further increase the number of slots, a wrench supporting slot 17 is located at the top of the support which is thus farther from the base than any other slot.

Whereas the block shown in FIG. 1 is essentially rectangular in overall configuration it may if desired be trapezoidal as seen in FIG. 4 with the slots formed in one or both of its tapering sides. This construction can provide greater stability.

With reference to FIG. 5, another embodiment is shown wherein each of the slots 16 has two arcuate portions, lug portions 18b and 18c. The portion 18c extending toward the base as in the FIG. 1 embodiment, and portion 18b extending away from the base. With this construction the block may be employed in inverted position to further increase the number of available spacings from the base at which the wrench may be supported.

Referring next to FIGS. 6 and 7 it will be seen that the portion 50 of the block in which the slots 16 are formed is offset from the base 12 to position the slots closer to the lug nut than the base. This construction is to accommodate a lug wrench having a short lever arm 20 adjacent its socket 22. The block would be positioned in upstanding position on its base adjacent to a wheel as in the FIG. 7. The offset portion 50 extends inwardly into the well 52 formed within the tire rim. The portion 50 will engage or subsequently engage the wheel hub or the actual lug nuts if there is no hub. The wrench would be employed in the same manner as previously described.

The offset version of the invention may also be used with conventional length ell wrenches or cruciform wrenches where in each instance it will have the additional advantage of placing the actual support areas, i.e., the arcuate portion 18 of the slots 16 as close as possible to the socket of the wrench as well as the advantage gained by the offset portion of the block position being supported by the wheel as well.

I claim:

1. A support for a wheel lug wrench comprising a block having a top, a base for positioning on a firm surface and at least two parallel vertical sides intersecting the base and extending upwardly from the base;

a plurality of wrench supporting slots formed in both sides of the block and extending inwardly at an angle inclined toward the base, each slot terminating at a closed end which is positioned on a vertical line which is located inwardly of and between the vertical sides, the base having a width which extends between the vertical sides, the width of the base being at least as wide as the sides so that when the base of the support is on a firm surface the closed end of each slot is positioned vertically above the base to afford lateral stability;

the slots being located at spaced intervals from the base to provide a series of wrench supports of varying heights;

the closed end of each slot having an arcuate portion engagable with the wrench;

whereby, the wrench may be selectively positioned in a slot to align and support it while removing or attaching a given wheel lug nut;

the slots on one side of the block being located in staggered height-wise relationship to those on the other side;

whereby the distance between each slot and the base is different.

2. A support according to claim 1 wherein there is a wrench supporting slot at the top of the support spaced farther from the base than any other slot.

3. A support according to claim 1 having an extender engagable with the lug wrench when the wrench is supported in a slot and engaged with a lug nut to increase the leverage of the wrench.

4. A support according to claim 1 wherein the base of the block is flared outwardly to afford lateral stability.

5. A support according to claim 1 wherein the block is rectangular in overall configuration.

6. A support according to claim 1 wherein the block is trapezoidal in overall configuration.

7. A support for a wheel lug wrench comprising a block having an upper portion and a lower portion, the lower portion having a base for positioning on a firm surface, two parallel vertical sides intersecting the base and extending upwardly from the base, a front vertical face and a rear vertical face, the upper portion having a top, two parallel vertical sides intersecting the top and extending downwardly from the top, a front vertical face and a rear vertical face, the upper portion of the block being joined to the lower portion in offset relationship, the front vertical face of the upper portion being substantially parallel to the front vertical face of the lower portion and spaced horizontally therefrom, the rear vertical face of the upper portion being substantially parallel to the rear vertical face of the lower portion and spaced horizontally therefrom, a plurality of wrench supporting slots formed in the sides of the upper portion of the block and extending inwardly at an angle inclined toward the base, each slot terminating at a closed end which is positioned on a vertical line which is located inwardly and between the vertical sides of the lower portion, the base having a width which extends between the vertical sides of the lower portion, the width of the base being at least as wide as the sides of the upper portion so that when the base of the support is on a firm surface, the closed end of each slot is positioned vertically above the base to afford lateral stability.

the closed end of each slot having an arcuate portion engagable with a wrench, whereby the wrench may be selectively positioned in a slot to align and support it while removing or attaching a given wheel lug nut and whereby the slots in the upper portion of the support may be positioned closer to a lug nut than the base to accommodate a wrench having a short lever arm adjacent to its socket.

8. A support according to claim 7 wherein there are spaced slots in two opposite sides of the block, the slots in the first side being located in staggered relationship to those on the second side, whereby the distance between each slot and the base is different.

9. A support according to claim 7 wherein there is a wrench supporting slot at the top of the support spaced farther from the base than any other slot.

10. A support according to claim 7 having an extender engagable with the lug wrench when the wrench is supported in a slot and engaged with a lug nut to increase the leverage of the wrench.

11. A support according to claim 7 wherein the base of the block is flared outwardly to afford lateral stability.

12. A support according to claim 7 wherein the block is rectangular in overall configuration.

13. A support according to claim 7 wherein the block is trapezoidal in overall configuration.

14. A support for a wheel lug wrench comprising a block having a top, a base for positioning on a firm surface and at least two sides;
a plurality of wrench supporting slots formed in at least one of the sides of the block, extending inwardly at an angle inclined toward the base and each slot terminating at a closed end;
the slots being located at spaced intervals from the base to provide a series of wrench supports;
the closed end of each slot having two arcuate portions selectively engagable with a lug wrench to support it while removing or attaching a lug nut, one portion extending toward the base and the other one extending away from the base;
whereby the block may be employed in inverted position to increase the number of available spacings from the base at which the wrench may be supported.

15. A support according to claim 14 wherein there are spaced slots in two opposite sides of the block, the slots in the first side being located in staggered relationship to those on the second side, whereby the distance between each slot and the base is different.

16. A support according to claim 14 wherein there is a wrench supporting slot at the top of the support spaced farther from the base than any other slot.

17. A support according to claim 14 wherein the block is rectangular in overall configuration.

18. A support according to claim 14 having an extender engagable with the lug wrench when the wrench is supported in a slot and engaged with a lug nut to increase the leverage of the wrench.

19. A support according to claim 14 wherein the block is trapezoidal in overall configuration.

* * * * *